Oct. 23, 1945.  W. W. CASTOR  2,387,243
FLAKE FOR DECORATIVE AND PROTECTIVE COATINGS
Filed Nov. 4, 1941
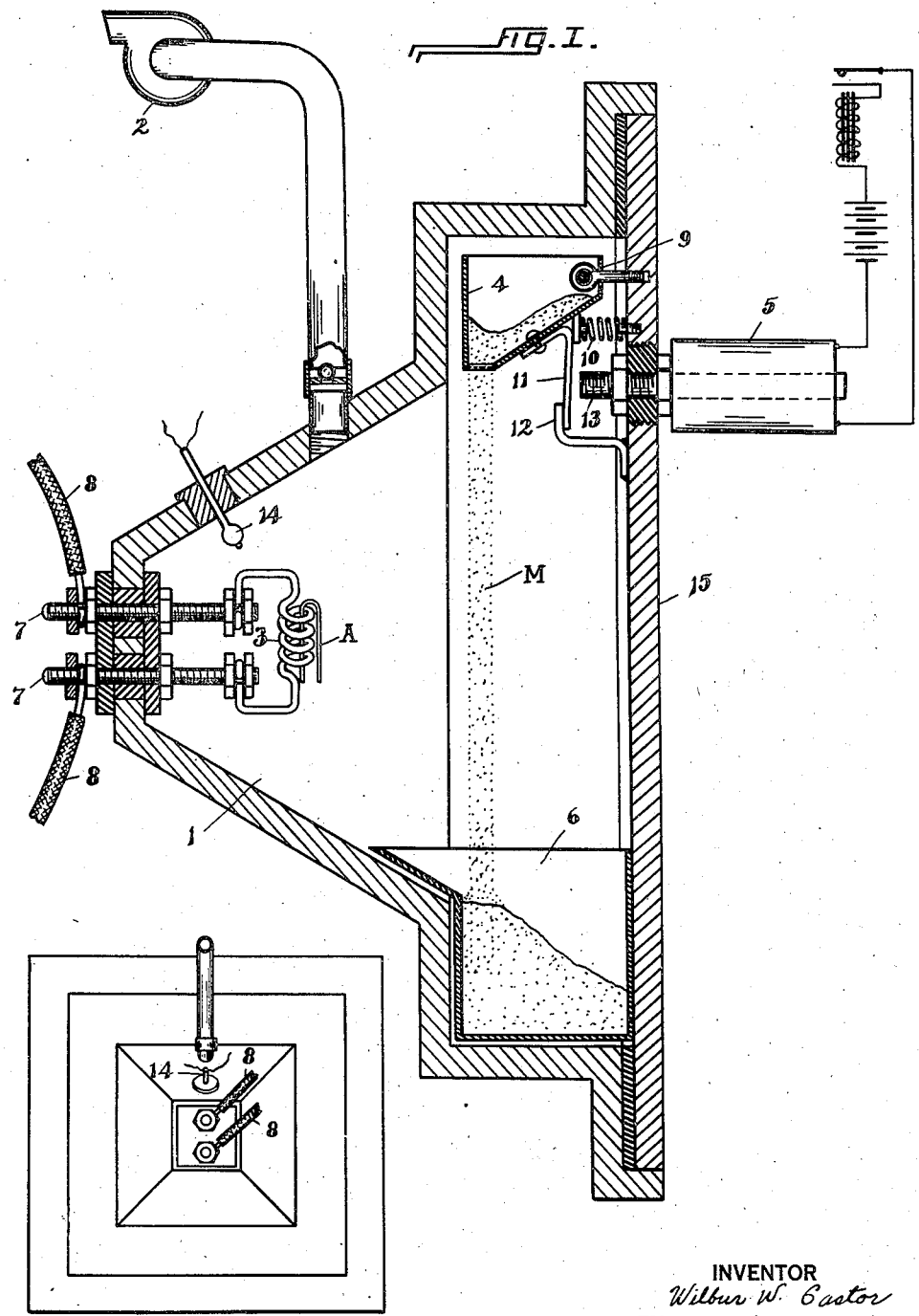
INVENTOR
Wilbur W. Castor
BY
Christy, Parmelee and Strickland
ATTORNEYS Patented Oct. 23, 1945

2,387,243

UNITED STATES PATENT OFFICE 2,387,243

FLAKE FOR DECORATIVE AND PROTECTIVE COATINGS

Wilbur W. Castor, Mount Lebanon, Pa.

Application November 4, 1941, Serial No. 417,867

4 Claims. (Cl. 106—290)

This invention relates to protective and ornamental metallic coatings that consist of a liquid carrier (typically a solution of shellac or other resin, natural or artificial, in a volatile solvent), in which particles of metal are suspended. The invention is found in a particle of unique composition adapted to serve as a homogeneous particle of metal in the preparation of metallic paints and coatings that carry metallic particles. The objects of invention are improvement in the character and quality of coating preparations of the nature indicated, with consequent improvement in the appearance and even in the utility of the coated article; and a further object is economy, due both to the extensive use of relatively inexpensive material and to saving in the quantity of material required to coat a given area of surface effectively.

In the accompanying drawing apparatus such as may advantageously be used in the preparation of the material of my invention is shown. Fig. I is a view in vertical section of the apparatus, with certain accessory instrumentalities indicated in diagrammatic manner; and Fig. II is a view to smaller scale, showing the apparatus in side elevation.

In the usual practice of preparing material for aluminum paint, fragmented aluminum is subjected to the action of a ball mill, and in the mill the metal is foliated and fragmented to the desired degree. The flaked material so produced is stirred into the liquid carrier. When the paint so prepared is spread, the freely suspended flakes of metal, in response to surface tension within the outspread layer of liquid, arrange themselves in planes parallel to the bounding surfaces. This is called leafing. The flakes, being present in sufficient quantity, lie in overlapped positions, and present to observation a substantially continuous metal surface. The solvent evaporates, and what is in effect a continuous layer of attenuated metal, remains embedded in the transparent coating of resin.

In decorating with lacquer it is known practice to disperse in the lacquer particles of gold, to give to the finished surface the appearance of being dusted with gold.

In the ornamentation of ceramics it is common practice to disperse in a liquid carrier (typically an oil, in solution in a volatile solvent) flakes of gold or of other metal, to apply the dispersion to the surface to be decorated (and with the consequent leafing of the flakes within the layer), to allow the work to dry, and then to fire it in a kiln. In this case the carrier is burned away, and the metal only remains, closely adherent to the ceramic surface.

In the printing art also, flakes and particles of metal are dispersed in a suitable carrier, generically and with extension of meaning called ink, and printed upon paper, cloth, and other suitable surfaces. Even the surfaces of articles of ceramic ware may by printing receive their decoration.

Such various uses are within the contemplation of my invention.

In the grinding of aluminum, and of other metals as well, for such uses, it is practically impossible to obtain a product of even approximately uniform particle size; and on such account metal powers for coating purposes are not wholly satisfactory. Uncontrollable irregularity is likely to appear. By way of precaution, it is the practice to overload the carrier liquid with the metallic powder; and such overloading is an embarrassment upon facility in the spreading of the coating.

The invention in this example consists in preparing the flakes as flakes of suitable material, typically flakes of mica, and plating the flakes with metal. The plating, conveniently applied in the manner presently to be described, though of microscopic thickness, is continuous upon the surface of the particle, so that a coating that includes the material of the invention is in no degree inferior in appearance to a coating in which homogeneous metal powder is used. One advantage of the material of the invention is that, whereas aluminum powder (for example) may not be graded to a limited range in particle size, materials of which mica is typical may be so graded. Mica flakes, limited to a desired range in particle size, being plated with metal, may be employed in place of homogeneous metal flakes. Since they may be provided in quantity and of desired uniformity in size, it is not necessary to overload the carrier with them. They will, without such overloading, afford the desired effect. A second advantage lies in and is consequent on the fact that mica is a material of less specific gravity than aluminum. The metal-plated mica flakes, therefore, of given size are lighter than all-metal flakes. Being lighter, they are more readily responsive to the influence of surface tension within the outspread layer of carrier liquid; they arrange themselves more readily in their flatwise position. And from this it follows that a thinner film may be spread if the flakes be of aluminum-plated mica than if they were of solid aluminum; and, with saving of material, equally good effect may be gained. For particular uses lightness is of intrinsic advantage. In aviation, and specifically in coating of the gas-bag of the balloon with aluminum paint, it is manifestly advantageous that without loss in effect the weight of the coating be diminished, below what heretofore has been possible.

Mica is a less expensive material than aluminum; and an adequate quantity of flakes of my invention for coating a given area of surface may be prepared and sold more cheaply than a similarly adequate quantity of all-metal aluminum powder.

There are other advantages besides. Mica is a material that is characteristically of laminate form, and the form persists when mica is ground to powder. The grains are minute plates or flakes that possess, in common with powdered aluminum, the shape that is advantageous in producing metallic coatings.

The manner of plating is one that, employed in the plating of mirrors, has never to my knowledge been employed in the plating of such minute articles as those here contemplated. The plating metal is vaporized in a vacuum chamber, and from vaporous condition is condensed upon the surfaces of the particles of mica exposed to it. The apparatus that I preferably employ is illustrated in the accompanying drawing. This apparatus and the method involved in its use are in detail new, and are made the subject of a copending application.

Within a suitable chamber 1, from which the air has by means of a pump 2 been exhausted, aluminum is vaporized. This may be accomplished by providing within the chamber a filament of tungsten that carries a fine coating of aluminum, and by heating the filament electrically to a temperature exceeding the vaporization point of aluminum. As shown in the drawing, a coil 3 of tungsten wire, included in an electric circuit, may at the beginning of operation carry suspended upon it a hair-pin bend A of fine aluminum wire. When the air has been exhausted from the chamber, a filament 3 is heated by the flow of current until the aluminum melts and spreads over the surface of the filament. Further heating then effects vaporization and the evacuated chamber becomes filled with aluminum vapor.

Within the chamber is included a quantity of powdered mica, and upon the powdered mica so present the vapor condenses and forms a plating upon it. Preferably I provide in the upper part of the chamber a dredge 4 and in this dredge the powdered mica is initially placed. When in the progress of operation the chamber has been first evacuated and then filled with aluminum vapor, the dredge 4 is agitated, as by the intermittent action of an electro-magnet 5 upon the spring-sustained dredge, and through the vapor the powdered mica is disseminated and caused to fall.

As the shower M of grains of mica falls through the vapor the aluminum will condense upon and will form a thin but continuous and closely adherent plating upon the mica particles. The mica particles will themselves be of dimensions that range typically from 0.5 to 50 microns through, and the thickness of the plating I have found to be of the order of three to five millionths of an inch. The plated particles may be gathered in a suitable receptacle 6, and removed in proper manner in the progress of operation.

Plating by condensation from vapor is a known procedure, employed in the production of mirrors, for example. The refinement of plating of particles as they are rained through the atmosphere of vapor is, however, believed to be new. As in the earlier procedure alluded to of the plating of mirrors, it is necessary in prolonged operation to scrape from the inner walls of the chamber the accumulations of metal condensed upon them.

It is known that, by the inclusion within the vacuum chamber of particular supplementary materials, the color of the condensed metal may be modified; thus, the presence of paraffin oil will give to the deposited plating of aluminum a purplish bronze cast; while wool fibre being present will give an amber color to it. By subjecting the tungsten filament to excessively high voltage and by prolonging the time of heating a yellow cast may be given to the deposited plating. Such refinements are available in the practice of my invention. Inevitably some minute quantity of tungsten will be vaporized with the aluminum, but the amount is small and the effect negligible. Inasmuch, however, as the wasting away of the tungsten filament is undesirable, the peak and the duration of the high-temperature condition to which the tungsten filament is subjected will ordinarily be limited to what is requisite.

In the preparation of aluminum powder the practice has been to include with the fragments of aluminum in the ball-mill charge a quantity of stearic acid. This addition of stearic acid has value and effect in more ways than one. It prevents agglomeration of the flakes of aluminum; it spreads as a protective film upon the lustrous surface of the attenuated flakes; and, when the coating is spread, it promotes the leafing of the flakes within the coating.

The plated flakes of my invention come from the plating chamber with lustrous surface. I find it desirable to film them over with a material such as to facilitate leafing within the outspread coating. A typical material for the purpose is stearic acid. Such filming over may be effected by the use of a flock gun, a device used to spray fibre flock under the impulse of an air jet. By such means I spray my metal-plated flakes under the impulse of a jet of heated inert gas (typically nitrogen) carrying a vaporous dispersion of stearic acid; and, just as in the first case the mica flakes received by condensation their plating of metal, so in this case the plated flakes received by condensation a covering film of stearic acid, and on projection into the atmosphere a proper bonding of the acid to the metal surface takes place. It is desirable to use an inert gas as the carrier, because in the presence of oxygen stearic acid when heated is liable to charring. If a heated chamber above a bath of molten stearic acid be filled with nitrogen, the heated gas will take up vapor that rises from the molten acid, and thus the conveying medium is prepared for jetting the flakes, that they in turn may receive upon their surfaces the desired film of condensed acid.

Not only aluminum may be employed in the manner described, but in like manner the carrier particles may be plated with copper, brass, bronze, silver, gold, and with metals and alloys generally. The only limiting circumstance is the ability of the means employed to bring the desired metal to the condition of a vapor within an evacuated chamber; and, by the means described, the vaporized metal must be vaporizable at a point below the melting-point of tungsten. But the characteristic feature of the invention is not conditioned by the tungsten-filament method of vaporizing. High temperature and vaporization are otherwise attainable. The characteristic feature is the preparation of an atmosphere of metallic vapor and the condensation of vapor upon particles of carrier material prepared and arranged to receive it.

I have by way of example described the use of mica as a suitable carrier in the practice of my invention. Other material may be used as the material to receive the metallic plating. Graphite, for example, assumes a similar laminate form; and graphite may be powdered and graded and then plated with metal, to accomplish the ends described, and with realization of the advantages and economies that have been dwelt upon.

It is not necessary that the carrier material have the laminate form that characterizes mica and graphite. There are cases in which, for decorative purposes, a lacquered surface has the appearance of being dusted with gold. In this case, not continuity, but discontinuity of appearance of the metallic particles is sought. And for purposes of decoration of such sort the carrier material may be carbon in finely divided condition, or silica, or other available material that shall remain solid and inert throughout the described course of treatment. And, in order to gain the dusted effect alluded to the quantity of plated particles that is distributed in the liquid material is properly limited and controlled.

Similarly as particles of mica, graphite, carbon, silica, etc. may be plated, so also particles of metal may be plated; and, while a particle of metal plated upon metal will ordinarily afford little or no gain or advantage in the matter of lightness, it may still afford advantage and very substantial advantage in the matter of cost. For example, iron powder may in such apparatus as that shown and described be plated by condensation with gold, and the plated particles may be distributed in a transparent lacquer and the lacquer spread to afford such decorative effect as would be gained by the use of solid gold particles.

I claim as my invention:

1. A flake for use in liquid coating compositions, consisting of a particle of mica bearing a metallic plating of the adherence due to condensation of metallic vapor upon it.

2. A flake for use in liquid coating compositions consisting of a particle of mica bearing an aluminum plating of the adherence due to condensation of metallic vapor upon it.

3. A particle for use in liquid coating compositions consisting of a flake of mica bearing a metallic plating of the adherence due to condensation of metallic vapor upon it, the metal-plated flake bearing a coating of stearic acid of the adherence due to condensation of stearic acid vapor upon it.

4. As a pigment for coating compositions, discrete particles of mica having a thin layer consisting of aluminum, adhered to their surfaces by deposition, said pigment possessing leafing properties.

WILBUR W. CASTOR.